(12) United States Patent
Kim et al.

(10) Patent No.: US 7,500,157 B2
(45) Date of Patent: *Mar. 3, 2009

(54) ERROR CORRECTION CODING METHOD FOR A HIGH-DENSITY STORAGE MEDIA

(75) Inventors: Dae Young Kim, Seoul (KR); Chang Hyun Eo, Seoul (KR)

(73) Assignee: LG Electronics Inc., Seoul (KR)

( * ) Notice: Subject to any disclaimer, the term of this patent is extended or adjusted under 35 U.S.C. 154(b) by 196 days.

This patent is subject to a terminal disclaimer.

(21) Appl. No.: 11/446,979

(22) Filed: Jun. 6, 2006

(65) Prior Publication Data

US 2006/0242486 A1    Oct. 26, 2006

Related U.S. Application Data

(63) Continuation of application No. 09/780,360, filed on Feb. 12, 2001, now Pat. No. 7,080,293.

(30) Foreign Application Priority Data

Feb. 12, 2000    (KR)    ................... 00-06698

(51) Int. Cl.
G06F 11/00    (2006.01)
H03M 13/00    (2006.01)

(52) U.S. Cl. ...................... 714/701; 714/758
(58) Field of Classification Search ............. None
See application file for complete search history.

(56) References Cited

U.S. PATENT DOCUMENTS

| | | | |
|---|---|---|---|
| 4,972,417 A | 11/1990 | Sako et al. | |
| 5,140,596 A | 8/1992 | Weldon, Jr. | |
| 5,546,409 A | 8/1996 | Karasawa | |
| 5,901,157 A | 5/1999 | Hogan | |
| 6,052,815 A | 4/2000 | Zook | |
| 6,079,046 A | 6/2000 | Tamura et al. | |
| 6,223,322 B1 | 4/2001 | Michigami et al. | |
| 6,311,304 B1 * | 10/2001 | Kwon | ............. 714/755 |
| 6,363,511 B1 | 3/2002 | Massoudi | |
| 6,378,103 B1 | 4/2002 | Han | |
| 6,430,723 B2 | 8/2002 | Kodama et al. | |
| 6,539,512 B1 | 3/2003 | Jeong et al. | |
| 6,621,782 B1 | 9/2003 | Nakane et al. | |
| 7,080,293 B2 * | 7/2006 | Kim et al. | ............. 714/701 |

FOREIGN PATENT DOCUMENTS

| | | |
|---|---|---|
| JP | 11-297000 A | 10/1999 |
| KR | 2000-0022714 A | 4/2000 |
| KR | 10-0273811 B1 | 9/2000 |

* cited by examiner

*Primary Examiner*—Cynthia Britt
(74) *Attorney, Agent, or Firm*—Birch, Stewart, Kolasch & Birch, LLP

(57) ABSTRACT

An error correction encoding method for a high-density storage medium is provided. This method arranges sequential input data so as to form a plurality of data blocks of a predefined matrix form, the plurality of data blocks being made sequentially, appends outer parity to each column of each data block in the column direction, appends inner parity to each row of each of the outer-parity-encoded data block in the row direction, reorders rows including outer parity so as to insert them separately into the other rows including no outer parity for each of the outer- and inner-parity-encoded data blocks, and writes rows in the same order in the reordered data blocks to a storage medium sequentially on row-by-row basis.

11 Claims, 3 Drawing Sheets

1 ECC Block = 37,586 Bytes

BACKGROUND ART $i = b / 172$
$j = b - 172*i$ $s = p*364+q \quad s = r*364+t+182$

ERROR CORRECTION CODING METHOD FOR A HIGH-DENSITY STORAGE MEDIA

CROSS REFERENCE TO RELATED APPLICATION

This application is a Continuation Application of U.S. patent application Ser. No. 09/780,360 filed on Feb. 12, 2001 and issued as U.S. Pat. No. 7,080,293 on Jul. 18, 2006, entitled "ERROR CORRECTION CODING METHOD FOR A HIGH-DENSITY STORAGE MEDIA", which claims priority on Korean Application No. 2000-6698 filed in Korea on Feb. 12, 2000. The entire contents of each application are hereby incorporated by reference.

BACKGROUND OF THE INVENTION

1. Field of the Invention

The present invention relates to an error correction encoding method for a high-density storage media.

2. Description of the Related Art

Data on a digital versatile disk (DVD) are generally encoded in a predefined error correction code (ECC). The ECC code is the two-dimensional Reed-Solomon code (hereinafter, referred to RS code) using an outer parity (PO) encoder and an inner parity (PI) encoder. Data bytes to be written in a disk are arrayed in rows and columns to be PO- and PI-encoded.

FIG. 1 shows the format of an ECC block in accordance with the DVD standard format. Data unit input to the RS encoder is (172×192)-symbols (a symbol size may be one byte) in size and has a block structure of a 172 columns by 192 rows matrix form. For every column of the input data block, the PO encoder appends outer parity of sixteen bytes to a 192-byte column in the column direction. The outer-error-correction encoded columns, each being 208-byte long, are then stored in a buffer of the RS encoder.

After outer-error-correction encoding of 172 columns is completed, 172 columns become arranged sequentially in the buffer. Then, for every row of the data block in the buffer, inner-error-correction encoding is performed sequentially by the PI encoder by appending inner parity of ten symbols to a 172-symbol row in the row direction.

In this way, the RS encoder produces the ECC block shown in FIG. 1. As a result, the ECC block is 37,586 bytes in size (182×208=37,586). Each symbol of the ECC block is then modulated by ESM (Eight to Sixteen Modulation) method, which converts 8 bits (one byte) to 16 channel bits so as to be written onto a storage medium like DVD.

The error correction encoding method using ECC block structure shown in FIG. 1 has been devised based on data density of current optical disks like DVD. It is, however, expected that for next-generation storage media of higher data density than DVD the error correction encoding method of the conventional art is vulnerable to burst errors.

It will be likely that next-generation high-density storage medium, the density of which is twice as high as DVD, has two times more channel bit errors than DVD for a scratch of the same size. Therefore, the development of an effective error correction encoding method is required to enhance the capability of correction of burst errors on next-generation high-density storage media.

SUMMARY OF THE INVENTION

A general objective of the present invention is to solve the above-mentioned problems and to provide an error correction encoding method of improving the error correction capability for high-density storage media and reading/writing devices for the high-density storage media.

The error correction encoding method for a high-density storage medium according to an aspect of the present invention, comprises the steps of: arranging sequential input data so as to form a plurality of data blocks of a predetermined matrix form, the plurality of data blocks being made sequentially, appending outer parity of a predetermined size to each column of each data block in the column direction, appending inner parity of a predetermined size to each row of each of the outer-parity-encoded data block in the row direction, reordering rows including outer parity so as to insert them separately into the other rows including no outer parity for each of the outer- and inner-parity-encoded data blocks, and reading out rows in the same order in the resulting data blocks sequentially and writing them to said storage medium on row-by-row basis.

The method of the present invention can be used in error correction for higher density storage media than DVD and reading/writing apparatus for higher density storage media. Also, the error correction encoding method according to the present invention is easy to implement on existing DVD recorders, thereby enabling to develop players capable of reproducing storage media of two types, or DVD and next-generation high-density storage medium, with less hardware development and production cost.

BRIEF DESCRIPTION OF THE DRAWINGS

The accompanying drawings, which are included to provide a further understanding of the invention, illustrate a preferred embodiment of this invention, and together with the description, serve to explain the principles of the present invention.

In the drawings.

DESCRIPTION OF THE PREFERRED EMBODIMENTS

The preferred embodiments of the present invention will be described in detail referring to the accompanying drawings.

Figure 1:
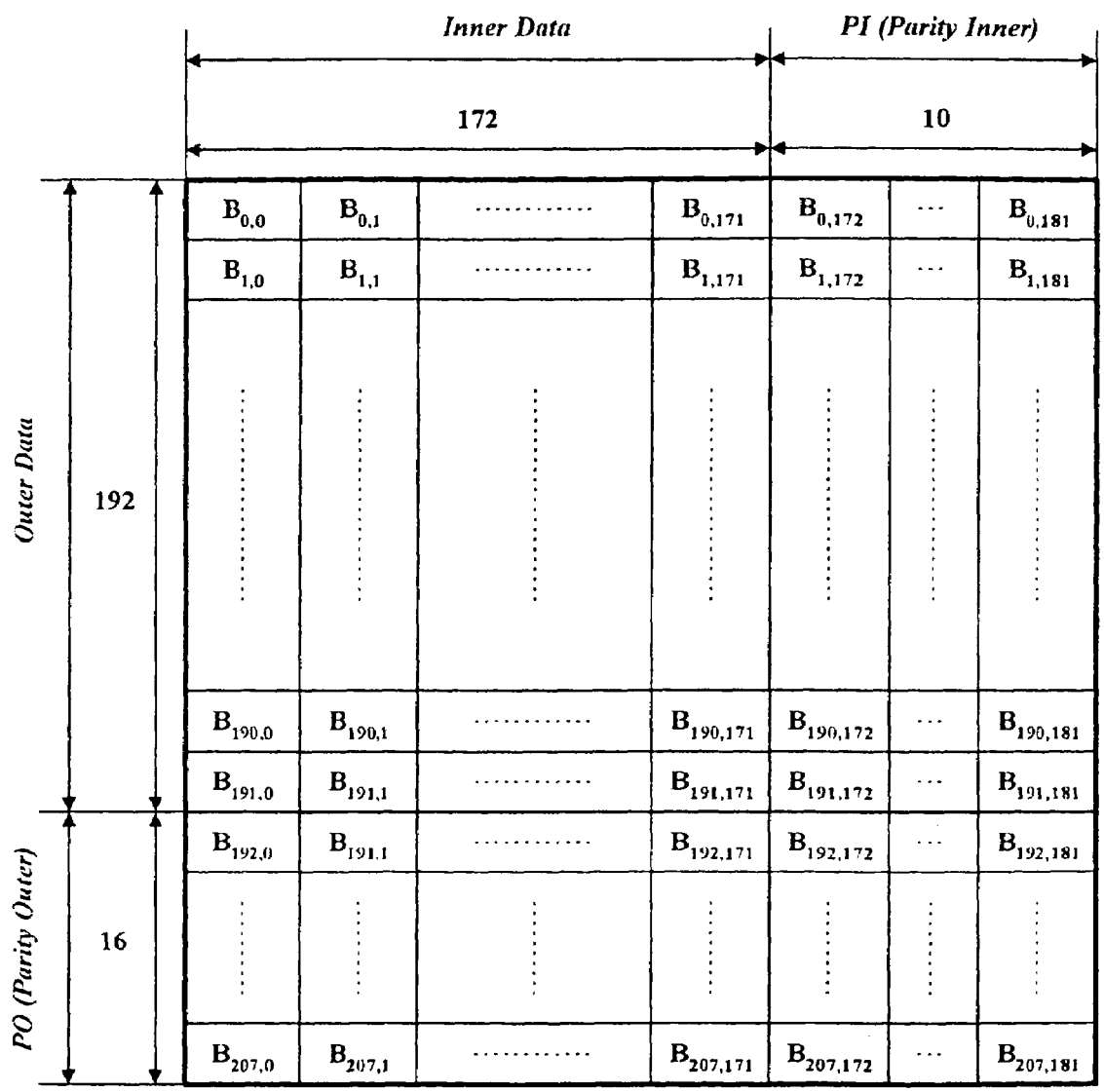
FIG. 1 shows an ECC block structure using a two-dimensional Reed-Solomon code according to the Background Art.
Figure 2:
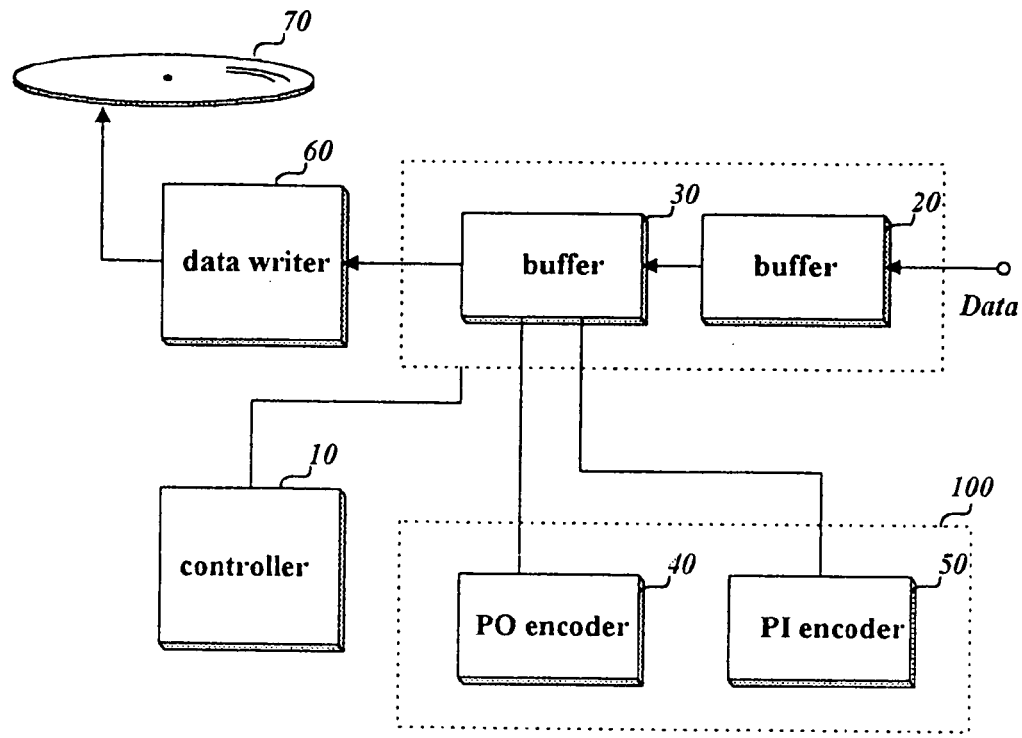
FIG. 2 is a block diagram of a data writing apparatus embodying the present invention.

FIG. 2 depicts a block diagram of a data writing apparatus according to an embodiment of the present invention. As shown in FIG. 2, the data writing apparatus comprises a controller 10 for controlling constituting components; a first buffer 20 for arranging input digital data that are sequentially inputted so as to form data blocks of a predetermined matrix form (hereinafter, unit block), and producing a pair of unit blocks, i.e., a first unit block and a second unit block, in the input order, under control of controller 10; a second buffer 30 for temporarily storing, under control of controller 10, the pair of unit blocks transmitted from the first buffer 20; an error correction encoding unit 100 having an outer parity (PO) encoder 40 for appending outer parity of a predetermined number of bytes, in the column direction, to each column of the pair of unit blocks and an inner parity (PI) encoder 50 for appending inner parity of a predetermined number of bytes, in the row direction, to each row of the pair of the outer-parity-encoded unit blocks that have been temporarily stored in second buffer 30; and a data writer 60 for reading out rows in the same order in the pair of the resulting unit blocks sequentially from second buffer 30 and writing the read-out rows into a high-density storage medium on row-by-row basis under control of controller 10.

With reference to the data writing apparatus of FIG. 2, the error correction encoding method according to the present invention will be described below in detail.

Figure 3:
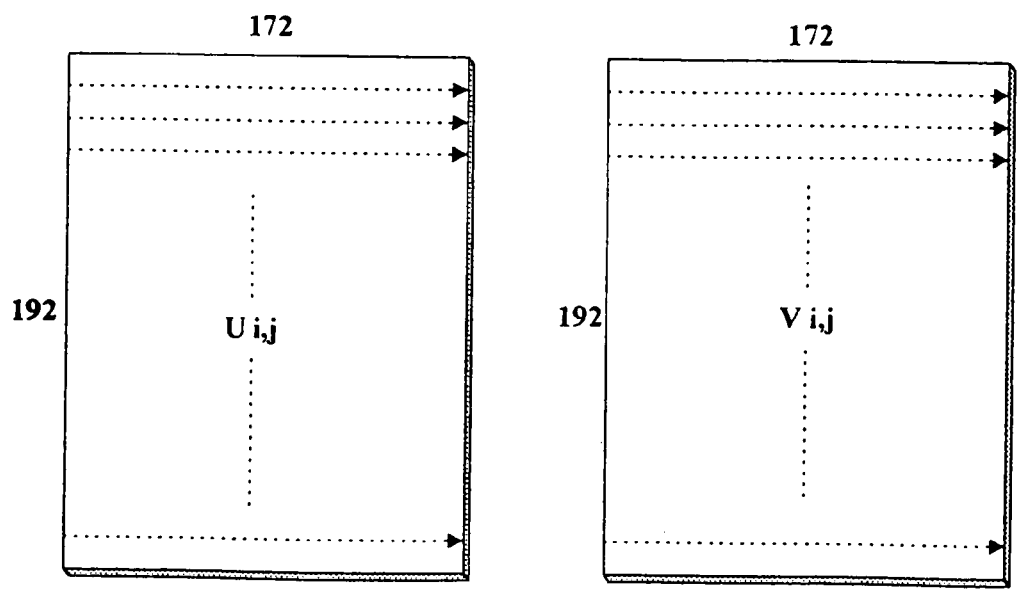
FIG. 3 shows formats of data blocks that are used in the error correction encoding method according to the present invention.

Digital data sequentially inputted to first buffer 20 are arranged in a manner that a pair of unit blocks, U(i,j) and V(i,j) shown in FIG. 3 are formed in first buffer 20, in the order as stated, under control of controller 10. Each unit block has 192 rows, each being 172-byte long. That is, each unit block is 33,024 bytes (172×192 bytes) in size. A pair of unit blocks, U(i,j) and V(i,j) are formed by arranging input data of 66,048 bytes. Specifically, letting row and column position in an unit block be represented by i and j, where $0<=i<=191$ and $0<=j<=171$ and an order in which bytes in the input data of 33,024 bytes are sequentially inputted be represented by b, where $0<=b<=(192\times172)-1$, each unit block is made by using the equations: $i=b/172$ and $j=b-(172\times i)$.

Once the generation of a pair of unit blocks, U(i,j) and V(i,j) is completed, the two unit blocks are transmitted from first buffer 20 to second buffer 30 under control of controller 10. On the other hand, controller 10 repeatedly controls first buffer 20 such that another pair of unit blocks are formed in first buffer 20 by arranging the sequential input data.

Figure 4:
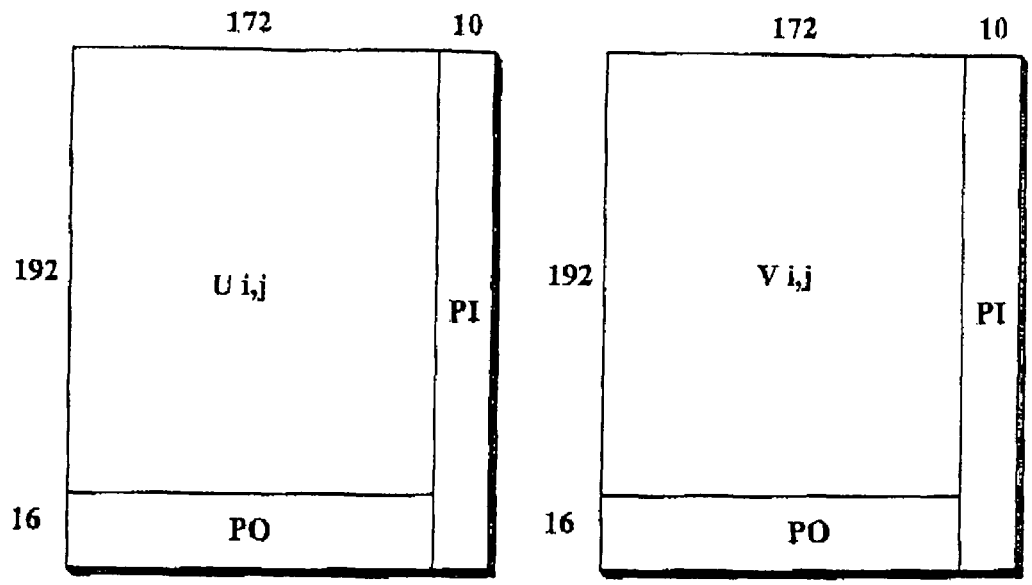
FIG. 4 shows data blocks of FIG. 3 after outer- and inner-error-correction encoding.

First, the first unit block U(i,j) in second buffer 30 is outer-error-correction encoded by PO encoder 40. That is, for every column of U(i,j), PO encoder appends outer parity of sixteen bytes to a 192-byte column in the column direction. Then, for every row of the resulting U(i,j), which has 208 rows, PI encoder 50 appends inner parity of ten bytes to a 172-byte row in the row direction. The same error-correction-encoding is carried out for second unit block V(i,j). FIG. 4 shows a pair of RS-encoded unit blocks, each resulting in (182×208) bytes in size.

After that, for encoded unit blocks U(i,j) and V(i,j) shown in FIG. 4, the sixteen rows including outer parity are reordered in order to insert them separately among the other 192 rows including no outer parity in such a way that one row including outer parity is positioned after every other twelve rows including no outer parity. By doing this, outer parities are prohibited from being damaged at a burst.

Figure 5:
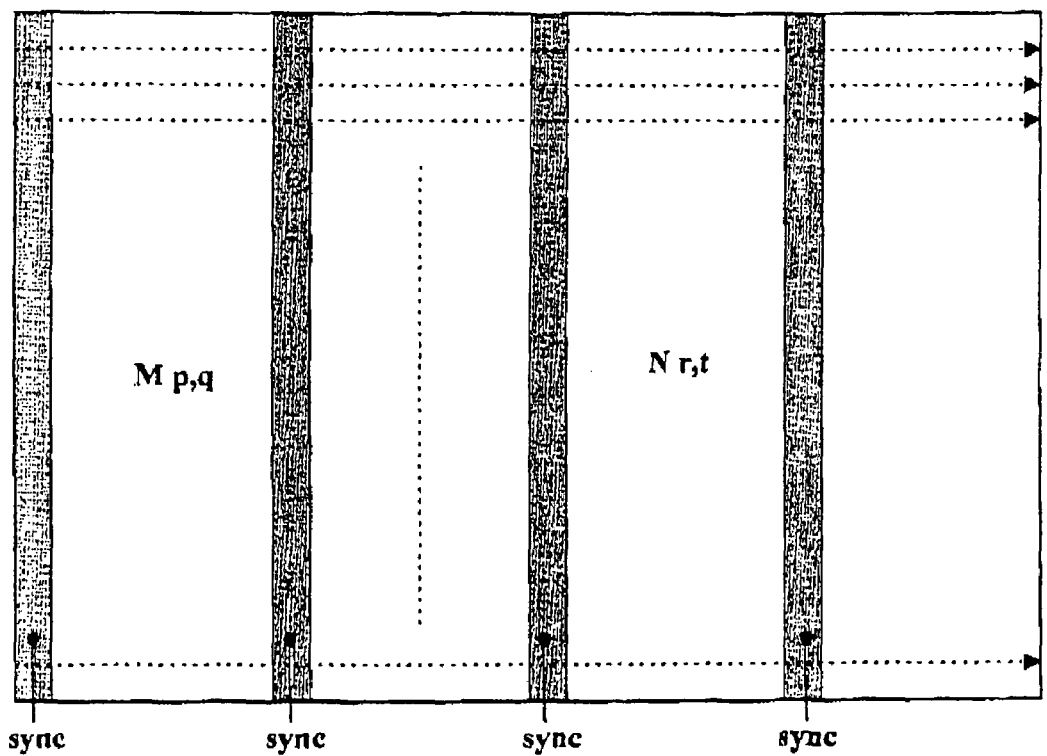
FIG. 5 illustrates a way in which two data blocks shown in FIG. 4 are written to a storage medium.

As shown in FIG. 5, the resulting unit blocks U(i,j) and V(i,j) are combined in such a manner that rows in the same order correspond to each other, thereby forming one combined block. Then, sync data is generated and inserted into appropriate positions of each row of the combined block. Finally, under control of controller 10 data writer 60 reads out data in one row of the combined block at a time from second buffer 30, as shown in FIG. 5 and modulates and writes the row including 364-byte data and inserted sync data onto high-density storage medium 70 sequentially. Such writing operation is repeated until 208 rows of the combined block are written onto high-density storage medium 70.

To be more specific, let (row, column) positions in the two unit blocks, M(p,q) and N(r,t) shown in FIG. 5 that underwent error-correction encoding and reordering of outer parity rows be represented by (p,q) and (r,t), respectively, where $0<=p$, $r<=207$ and $0<=q$, $t<=181$, and an order in which bytes in the combined block of FIG. 5 are sequentially written to storage medium 70 be represented by s, where $0<=s<=(182\times208\times2)-1$. In the writing operation, data to be read out from the unit blocks M(p,q) and N(r,t) is determined by the following equations: $s=p\times364+q$ and $s=r\times364+t+182$.

The foregoing is provided only for the purpose of illustration and explanation of the preferred embodiment of the present invention, so changes, variations and modifications may be made without departing from the spirit and scope of the invention.

What is claimed:

1. A method for processing digital data for use with a storage medium, comprising:
   arranging input digital data so as to form a first data block and a second data block of a predetermined matrix form;
   appending outer parity of a predetermined size and inner parity of a predetermined size to each column and row of the first data block and the second data block respectively to form a first and a second ECC (Error Correction Code) sub-blocks;
   combining the first ECC sub-block and the second ECC sub-block as forming one ECC block being subjected to error correction;
   reordering rows of the first and the second ECC sub-blocks so as to insert the rows including outer parity separately into other rows including no outer parity; and
   writing sequentially rows having the same row number in the ECC sub-blocks with sync data.

2. The method according to claim 1, each of the first data block and the second data block having an X x Y byte size, where X is 172 and Y is 192.

3. The method according to claim 2, said outer parity being 16-bytes long and said inner parity being 10-bytes long.

4. The method according to claim 1, said appending step comprising of the sub-steps of:
   appending said outer parity of a predetermined size to each column of each of said ECC sub-blocks in the column direction; and
   appending said inner parity of a predetermined size to each row of each of said ECC sub-blocks outer-parity-encoded in said outer parity appending step in the row direction.

5. The method according to claim 1, said reordering step comprising inserting outer parity between rows including no outer parity such that the number of rows including no outer parity between two rows including outer parity is 12.

6. A method for reproducing data from a storage medium, comprising:
   receiving digital data from a storage medium; and
   reproducing the digital data,
   the digital data being an ECC (Error Correction Code) block of predetermined matrix form having a first and a second ECC sub-blocks, the ECC sub-blocks have inner parity and outer parity of predetermined size respectively, and the ECC block being recorded with sync data on the storage medium after reordering rows of the first and the second ECC sub-blocks so as to insert rows including outer parity separately into other rows including no outer panty.

7. The method according to claim 6, each of the first data block and the second data block having an X×Y byte size, where X is 172 and Y is 192.

8. The method according to claim 6, said outer parity being 16-bytes long and said inner parity being 10-bytes long.

9. The method according to claim 6, the rows including outer parity being inserted separately between other rows including no outer parity such that the number of rows including no outer parity between two rows including outer parity is 12.

10. A storage medium for data recording and/or reproducing, comprising:

a lead-in area, a data area, and a lead-out area, the data area including digital data, the digital data being an ECC (Error Correction Code) block of predetermined matrix form having a first and a second ECC sub-blocks, the ECC sub-blocks have inner parity and outer parity of predetermined size respectively, and the ECC block is recorded with sync data on a storage medium after reordering rows of the first and the second ECC sub-blocks so as to insert rows including outer parity separately into other rows including no outer parity.

11. The storage medium according to claim 10, the rows including outer parity being inserted separately between other rows including no outer parity such that the number of rows including no outer parity between two rows including outer parity is 12.

* * * * *